April 19, 1966    A. V. ALEXEFF    3,246,858
ROLL SHAFT SUPPORT
Filed Jan. 13, 1964    2 Sheets-Sheet 1
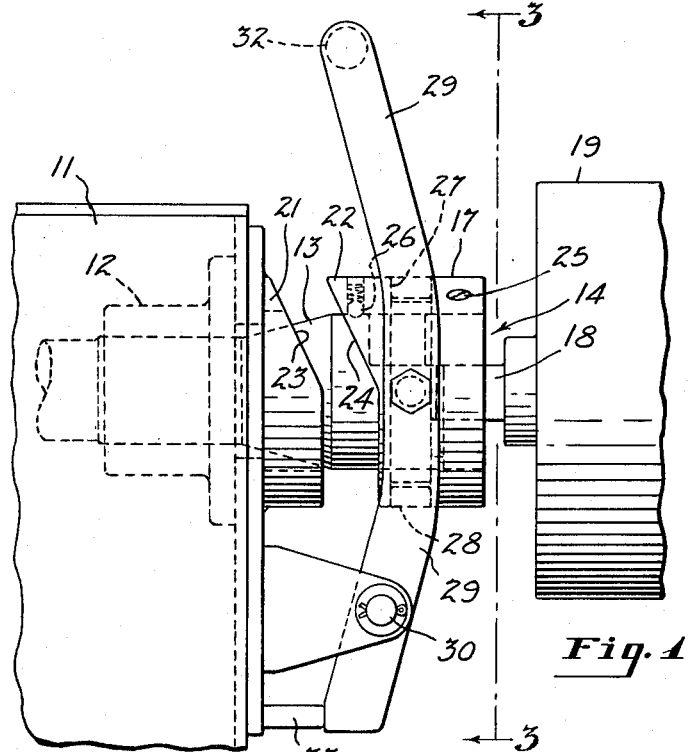
Fig. 1
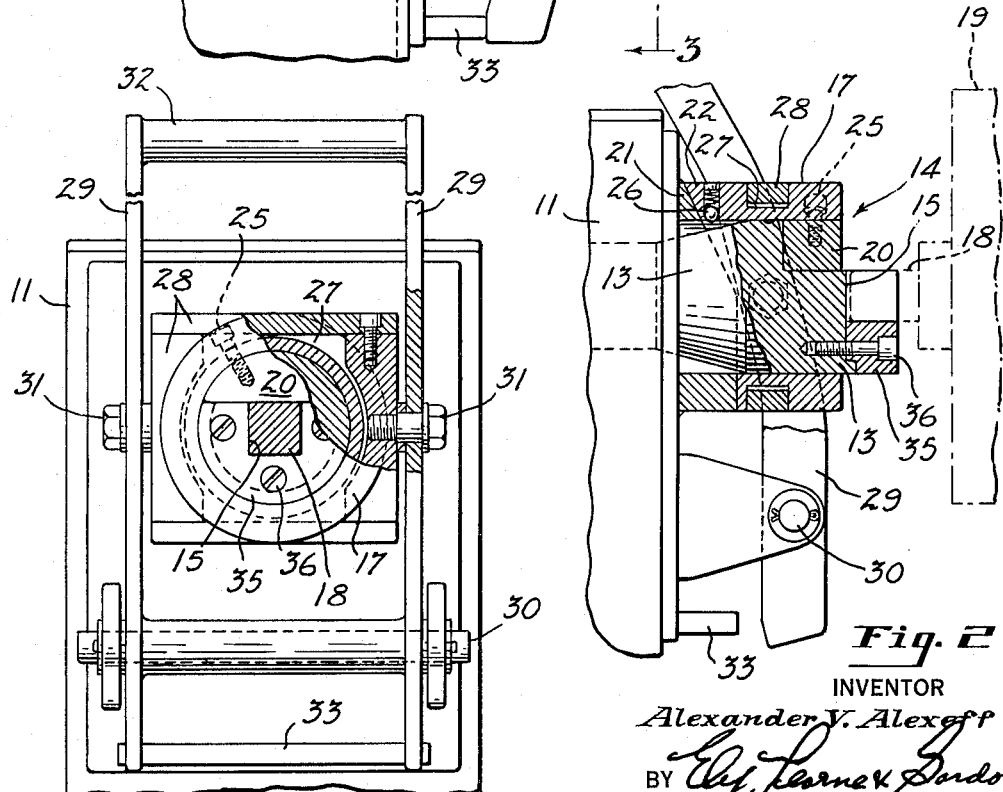
Fig. 3
Fig. 2
INVENTOR
Alexander V. Alexeff
BY Ely, Pearne & Gordon
ATTORNEYS April 19, 1966  A. V. ALEXEFF  3,246,858
ROLL SHAFT SUPPORT
Filed Jan. 13, 1964  2 Sheets-Sheet 2
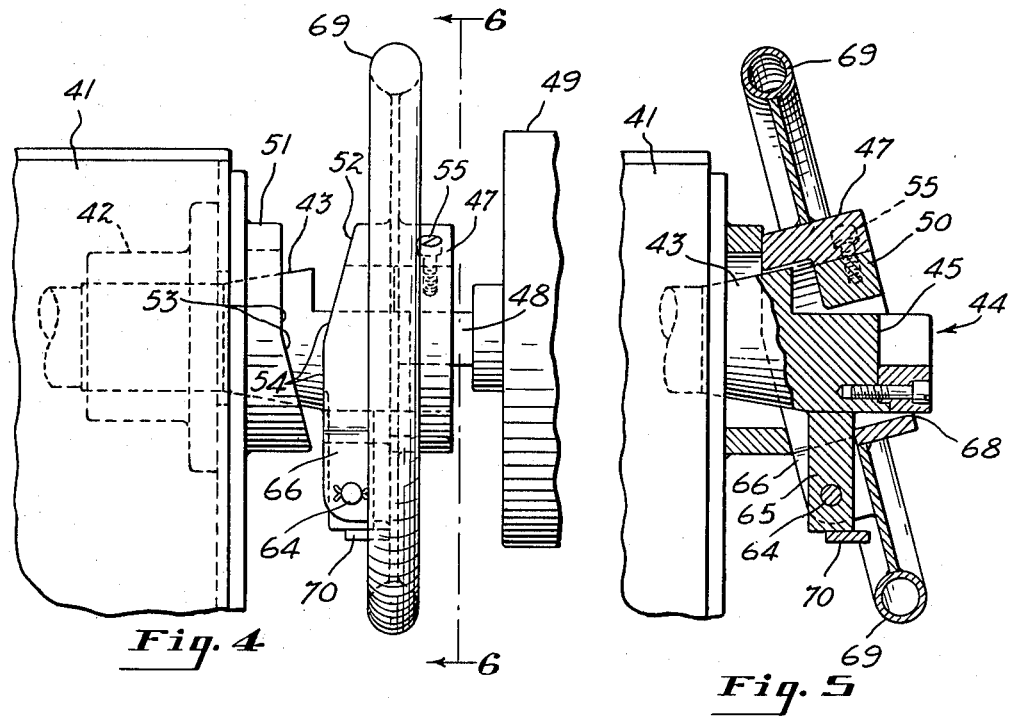
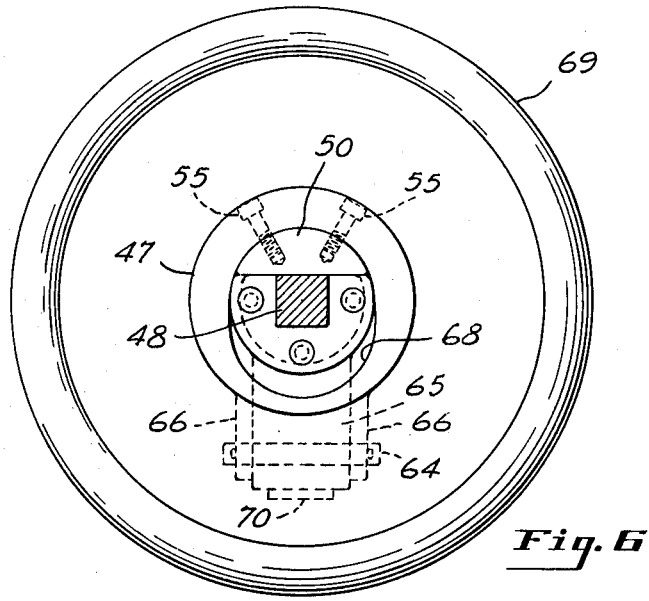
INVENTOR
Alexander V. Alexeff
BY
ATTORNEYS United States Patent Office 3,246,858
Patented Apr. 19, 1966

3,246,858
ROLL SHAFT SUPPORT
Alexander V. Alexeff, Cleveland, Ohio, assignor to Industrial Ovens, Incorporated, Cleveland, Ohio, a corporation of Ohio
Filed Jan. 13, 1964, Ser. No. 337,489
2 Claims. (Cl. 242—68.4)

This invention relates to quick-release chucks used for mounting and holding replaceable rolls in web processing lines such as tire cord fabric treating lines and the like. Such chucks are adapted for relatively quick and frequent replacement of rolls. For example, it may be necessary to frequently replace take-up and let-off rolls on a production line.

It is important from a safety standpoint to guard against the inadvertent release of the heavy replaceable roll from its quick-release chuck under such conditions that the roll may drop and cause serious injury and costly property damage.

Conventional arrangements for preventing accidental dropping of heavy replaceable rolls involve collars or flanges positioned in such a way as to catch the roll shaft should it drop out of the open chuck. Such collars or flanges are bolted to the stationary roll stand. Even a limited drop may cause some damage and production delay. This may result if a roll is placed in the open check and then is inadvertently rotated as by being spliced into the production line before the chuck is closed. The invention avoids this possibility in a simple manner.

A general object of the present invention is to improve on the safety chuck arrangements of the prior art. Another object is to provide a self-closing safety chuck which is simple and trouble free in its operation.

The objects and features of the invention will be more fully understood from the following description of examples of the invention.

In the drawings:

FIGURE 1 is a fragmentary elevational view of a chuck arrangement embodying the invention.

FIGURE 2 is a view similar to FIGURE 1 showing the parts in a different position and showing additional sectional details.

FIGURE 3 is a view taken from the plane of line 3—3 in FIGURE 1, with additional parts broken away.

FIGURE 4 is a fragmentary elevational view showing another roll chuck arrangement embodying the invention.

FIGURE 5 is a view similar to FIGURE 4 but showing the parts in a different position and showing many of the parts in section.

FIGURE 6 is a view taken from the plane of line 6—6 in FIGURE 4.

In FIGURE 1 there is shown a roll chuck which includes fixed mounting means including a stand member 11 in which is mounted a bearing 12 which carries a central rotatable member 13 which has a free end generally indicated at 14 (FIGURE 2) Formed in the free end of the rotatable member 13 is a bar-receiving open-ended socket 15 having an openable side. In the position of the parts shown in the drawings, the openable side is at the top of the socket 15.

A collar 17 surrounds the rotating member 13 and turns bodily therewith. The collar 17 is displaceable between a first position shown in FIGURE 1 at which the collar closes the openable side of the socket 15 and a second position shown in FIGURE 2 at which the collar does not close the openable side of the socket. When the openable side is closed as in FIGURE 1, the bar 18 of the roll 19 may not be released from the socket 15. When the openable side is opened as in FIGURE 2, the bar 18 may be lifted from the socket 15.

In the particular structure, the collar 17 includes an insert 20 which is fastened to the outer portion of the collar by the bolts 25. The insert 20 closes the openable side of the socket 15.

Interacting interlocking members 21 and 22 are carried respectively on the stand member 11 and the collar 17. The member 22 may simply comprise a rearward extension of the collar 17. The collar 17 turns with the rotatable member 13 and with the bar 18 of the roll. The members 21 and 22 are formed so that the collar is prevented from full movement from the position shown in FIGURE 1 to the position shown in FIGURE 2 unless the parts are in their illustrated rotative position, that is, unless the openable side of the socket 15 faces upwardly.

The contoured surfaces 23 and 24 constitute interacting camming means for forcing the collar 17 toward the closed position shown in FIGURE 1 upon rotation of the openable side of the socket 15 away from an upwardly facing position. Thus if the chuck is carrying a roll and is in the position shown in FIGURE 2, rotation of the roll will force the contour 24 to ride up on the contour 23 and will force the collar 17 to the right as the openable side of the socket 15 turns away from the upwardly facing position. When the socket 15 is thus partially closed after only a few degrees of movement, the insert 20 will overlie the socket 15 to a degree sufficient to hold the bar 18 in place. When the socket 15 is fully closed, a detent 26 seats in a depression formed in the member 13 to prevent the collar 17 from drifting from closed position. However even if such drifting does occur, the contours 23 and 24 will, during a succeeding rotation, again fully close the chuck.

In the illustrated structure, the collar is provided with an annular groove 27 which slidingly receives a trunnion frame 28. The trunnion frame is shifted by lever arms 29 pivoted to the stand member 11 as at 30 and to the trunnion frame 28 as at 31. The lever arms 29 may be actuated by a handle 32 or by a remotely controlled pneumatic or hydraulic actuator (not shown). A stop 33 determines the fully advanced or closed position of the chuck.

The portion of the central rotatable member 13 that defines the non-openable side of the socket 15 may be a hardened replaceable insert 35 which is held in place by bolts 36. The bolts 25 and/or the bolts 36 may be shear bolts designed to break before other parts are damaged in the unlikely event that the chuck is jammed.

In the example of FIGURES 4–6, a roll stand 41 carries a bearing 42 in which turns a central rotatable member 43 having a free end generally indicated by the reference numeral 44. At this free end is a bar-receiving open-ended socket 45 having an openable side.

A collar 47 turns bodily with the member 43. The collar 47 carries the insert 50 which closes the openable side of the socket 45. The insert 50 is held by bolts 55.

A member 65 extends downwardly from the central rotatable member 43 and a pair of members 66 extend downwardly from the collar 47. A pivot is formed between these downwardly extending members at 64. A clearance 68 is formed in the collar 47 to allow it to pivot with respect to the central rotatable member 43 as shown in FIGURE 5. The handle 69 in the form of a rimmed disc is fixed to the collar 47.

Interacting interlocking members 51 and 52 are respectively carried by the stand member 41 and the collar 47. The member 52 comprises simply the rearward portion of the collar 47. Contoured surfaces 53 and 53 are respectively formed on the members 51 and 52 and constitute camming means for forcing the collar from the open position shown in FIGURE 5 to the closed position shown in FIGURE 4 when the openable side of the socket 45 is turned away from an upwardly facing position. Only when the openable side is at such upwardly facing position can the bar 48 of the roll 49 be removed from the socket 45.

A stop 70 is fastened to the bar of the downwardly extending member 65 for the purpose of defining the advanced or fully closed position of the collar 47 as most clearly seen in FIGURE 4.

The invention is not restricted to the slavish imitation of each and every one of the details described above, which have been set forth merely by way of example with the intent of most clearly disclosing the teachings of the invention. Obviously, devices may be provided which change, eliminate, or add certain specific details without departing from the invention.

What is claimed is:

1. A roll bar chuck comprising fixed mounting means, a central rotatable member carried on said fixed mounting means and mounted for rotation on a horizontal axis, said rotatable member having a free end at which is formed a bar-receiving open-ended socket having an openable side, a collar surrounding said rotating member and bodily turnable therewith, said collar being displaceable between a first position at which said collar closes said openable side of said socket (whereby a roll bar held therein cannot be released) and a second position at which said collar does not close said openable side of said socket (and therefore a roll bar may be positioned in or removed from said socket), interacting members carried respectively on said fixed mounting means and on said collar for preventing said collar from full movement from said first position to said second position unless said openable side of said socket faces upwardly.

2. A device as defined in claim 1 in which said interacting members include interacting camming means for forcing said collar toward said first position upon rotation of said openable side of said socket away from an upwardly facing position.

References Cited by the Examiner
UNITED STATES PATENTS
3,038,680   6/1962   Rose _____ 242—68.4

MERVIN STEIN, *Primary Examiner.*